United States Patent

[11] 3,624,361

| [72] | Inventors | Gianfranco Rossi;<br>Paolo Scotuzzi; Vittorio Ropa, all of<br>Brescia, Italy |
|---|---|---|
| [21] | Appl. No. | 767,240 |
| [22] | Filed | Oct. 14, 1968 |
| [45] | Patented | Nov. 30, 1971 |
| [73] | Assignees | Gaspare Cavallina<br>Florence, ;<br>Roberto Berti<br>Florence; Gianfranco Rossi, Brescia, Italy |

[54] ELECTROMECHANICAL ASSEMBLY FOR RECEIVING AND TOTALING PULSES AND, PARTICULARLY, FOR REGISTERING READINGS TAKEN FROM METERS
6 Claims, 8 Drawing Figs.

[52] U.S. Cl. .................................................. 235/92 AC,
    235/92 R, 235/92 EL
[51] Int. Cl. .................................................. G01d 4/00
[50] Field of Search .......................................... 235/92 (1),
    92 (29 E), 92 (29), 92 (21), 92 (29 FL), 92 (65),
    94, 151.34; 340/378–379, 359, 361; 222/23

[56] References Cited
UNITED STATES PATENTS

| 3,221,926 | 12/1965 | Winiger | 235/92 UX |
| 3,268,712 | 8/1966 | Lee et al. | 235/92 |
| 3,275,807 | 9/1966 | Harper | 235/92 |
| 3,329,805 | 7/1967 | Wells | 235/92 |

Primary Examiner—Maynard R. Wilbur
Assistant Examiner—Joseph M. Thesz, Jr.
Attorney—Stevens, Davis, Miller & Mosher ABSTRACT: An electromechanical assembly for the collection of readings taken from meters (such as electric power-, water-, or gas-meters) and the recordal of the data on cards or other recording media, is disclosed, wherein the consecutive revolutions of the meter rotor (e.g., the unity wheel or gear) are converted into pulses by the agency of electrical contacts; the pulses are counted and summed by an adding device. Provisions are also taken for encoding the individual meters, consumers, kind of supply (e.g., water, electric power, etc.) and a wide possibility of encoding, data collection and invoicing is afforded. Readings can also be collected by a suitably equipped mobile unit: this can be mounted on a truck, for example.

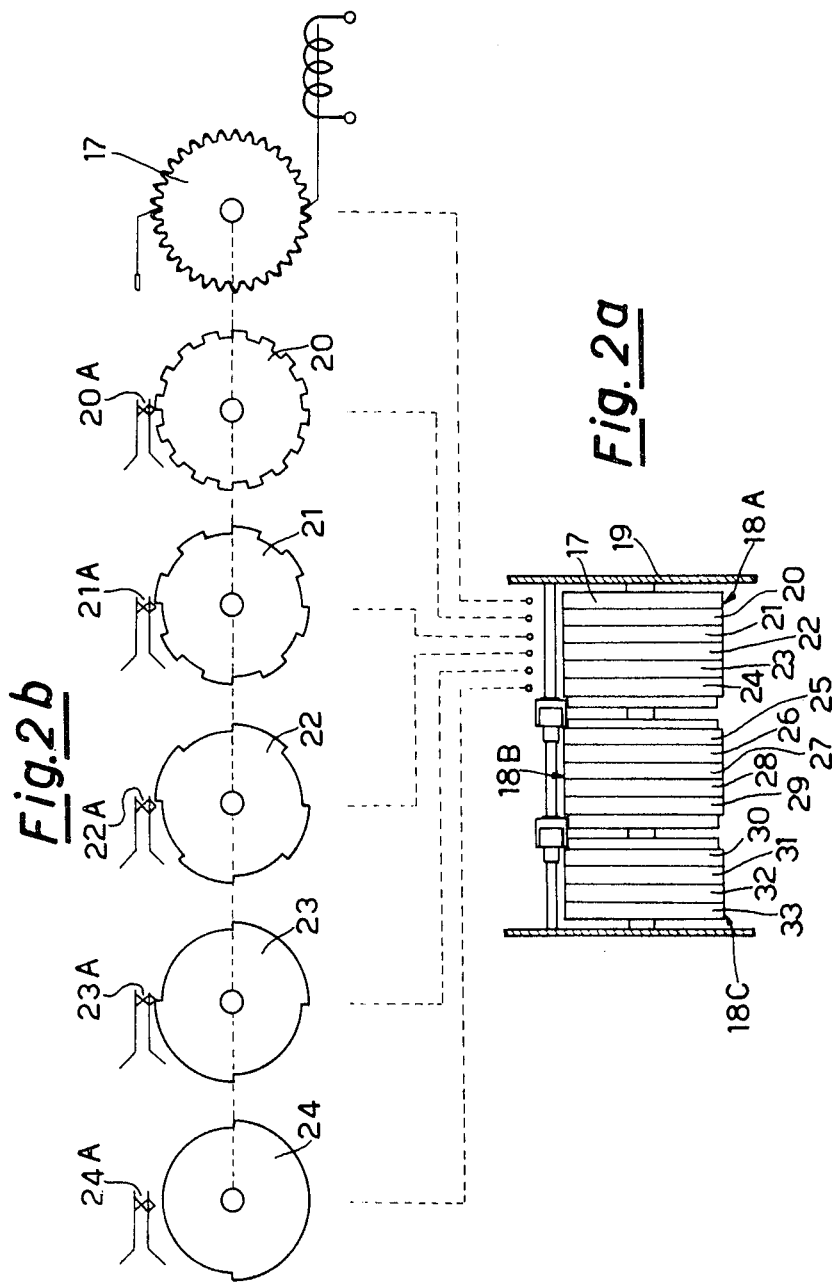

3,624,361

ELECTROMECHANICAL ASSEMBLY FOR RECEIVING AND TOTALING PULSES AND, PARTICULARLY, FOR REGISTERING READINGS TAKEN FROM METERS

This invention relates to an electromechanical assembly which is a adapted to permit the reception and totaling of pulses and, more particularly, the registration of readings of consumed commodities as shown by meters installed in the premises of users of a distribution service, for example, the supply of electric power.

It is well known that the method which is commonly adopted in the organizations which dispense drinking water, town gas, and electric power utilizes meters for measuring the commodities consumed by the individual users, said meters being installed in the users' premises. Occasionally, readings should be taken from said meters by personnel commissioned to this purpose, that is an employee, who make door to door trips according to a preestablished route and copy on specially provided forms the data read from each individual meter.

The data thus taken from each individual user should then be processed for invoicing according to the methods adopted in the individual concerns.

A number of drawbacks are known for this method and they can be summarized as follows:

efficiency is limited by all the factors of uncertainty which are due to the wide employment of humans;

the work is not satisfactorily completed on account of the inconvenient access to the meters;

there are reading errors due to the human factor;

there is the necessity of translating the data taken by the employees into an invoicing code, by punching cards, when an electric accounting system is utilized;

the running costs are very high since many individuals should be employed and their work is usually unaided by mechanical means.

Attempts have been made towards overcoming a few of the shortcomings outlined above by various expedients; the efficiency of these, however, has proven to be poor, or adapted to certain particular cases only.

For example, in an attempt to facilitate reading taking and to speed it up, it has been suggested, wherever possible, to install the meters on the landings of the buildings, or also in specially provided rooms, but such an arrangement could not be adopted on a large scale, especially in old buildings, due to technical, safety, economical and sometimes aesthetical reasons. More particularly, the grouping of the water and gas meters in self-contained units is such as to offer many obstacles and sources of expenditure, a mounting pillar being required for each individual user.

This invention aims at doing away with drawbacks and shortcomings of the kind briefly recalled above, by an electromechanical assembly for the registration of digital data by totaling received pulses, more particularly the readings taken from electric power, gas, water, and similar meters, characterized in that it comprises a data registration device by summing a corresponding number of pulses and a device for transferring and entering the sum registration on cards, strips, magnetic tapes and the like.

Said assembly comprises:

a pulse-receiving device adapted to convert said pulses into corresponding mechanical displacements;

a summation device for the number of pulses, actuated by the receiving device, and comprising one or more component parts connected by a linkage, by the agency of which the combination of the angular and/or linear displacements of the several members displays, in a positional code, the number of the received pulses, each member consisting of one or more individual parts integrally connected to one another, each part comprising a plurality of members adapted to indicate the angular and/or linear position, the number of said indicator members being increased, from each component part to the next by a member, according to a geometrical series whose ratio is an integer;

a device for detecting the positional code of the members described above by signalling devices actuated by the position-identifying members carried by the component parts which make up the members, said signalling devices being, according to the known telecontrol techniques, of the electric-contact, magnetic, hydraulic, pneumatic, or other type.

In mathematical terms, the ratio "$m$" of the geometrical series made up by the increasing numbers of the component parts in succession forms the base of the numerical code intended for the positional identification, whereas the number "$n$" of the component parts of each member forms, for the member concerned, the number of significant digits which can be digits which can be displayed thereby in the numerical system adopted as the positional index for the summation of the pulses. The result is that that $m^n$ represents, for the individual member concerned, the number of significant positions which can be taken.

More particularly, if the mechanism is composed by "$k$" equal members, the number of significant positions, and thus of the pulses which can be summed, is $m^{kn}$, whereas, if the members are different in that they are characterized by the respective values: $m_1, n_1; m_2, n_2 \ldots\ldots m_k, n_k$, the number of the pulses which can be summed would be:

$$m_1{}^{n_1} \cdot m_2{}^{n_2} \ldots m_k{}^{n_k}$$

In an exemplary embodiment, the assembly could comprise: a number "$k$" of rollers rotatable about their axis, each roller being formed by a number "$n$" of discs, integrally connected to each other and carrying on their peripheral surfaces an increasing number of protrusions, their number being increased in geometrical series from any component part to the next one, the ratio of the series being an integer, "$m$"; an electromagnet controlled with pulses from the meter so as to rotate at each pulse the first of said rollers through an angle of $360°/n^n$, each roller imparting, at every revolution, an angular advance of $360°/n^n$ to the next roller; a number "$k \cdot n$" of electric contacts which can be closed, each, by the protrusion of the respective disc, said position-detecting device actuating a plurality of elements for transferring and entering the readings which have been taken, as indicated above, on cards, said elements being controlled, each by an electric circuitry which comprises one of said contacts. More particularly, one of the objects of the present invention is the combination of a number of electromechanical assemblies according to this invention and of the kind described, distributed through the different supplies (e.g., electric power for lighting, for household appliances etc.) allotted to each consumer, each of said groups comprising, in addition, an additional static identification device for each individual electromechanical assembly and for each consumer.

It is clear, as a logical consequence, for example, in the domain of the requirements for a distributing concern of the kind recalled above, that said combination can be grouped, in turn, into greater units, each of which has, also, its identification device.

Among the numerous advantages of the present invention, these are the principal ones:

The carry over operations effected by the summing device are simplified and are quicker than those obtained with the conventional methods. These operations, moreover, are not impaired by the risk of errors which could be due to the human factor.

The data re entered according to an encoding system which permits the direct utilization of the data for processing them, thus suppressing long and expensive transcription steps.

The labor forces required for collecting and transcribing the readings are drastically reduced in number.

It is possible to transcribe the readings entered by the electromechanical assemblies at any time of the day or night or according to the convenience of the personnel and/or the consumer.

The invention can be carried out without any costly or cumbersome modifications of the existing installations.

The invention will be now described in connection with a preferred embodiment thereof by way of example only and without any implied limitation, said example being concerned with the registration of the readings of consumptions corresponding to uses of electric power, water and gas, reference being had to the accompanying drawings, wherein:

FIG. 2a and FIG. 2b are detailed views of the pulse counter with binary markers for the consumed commodities.

Figure 1:
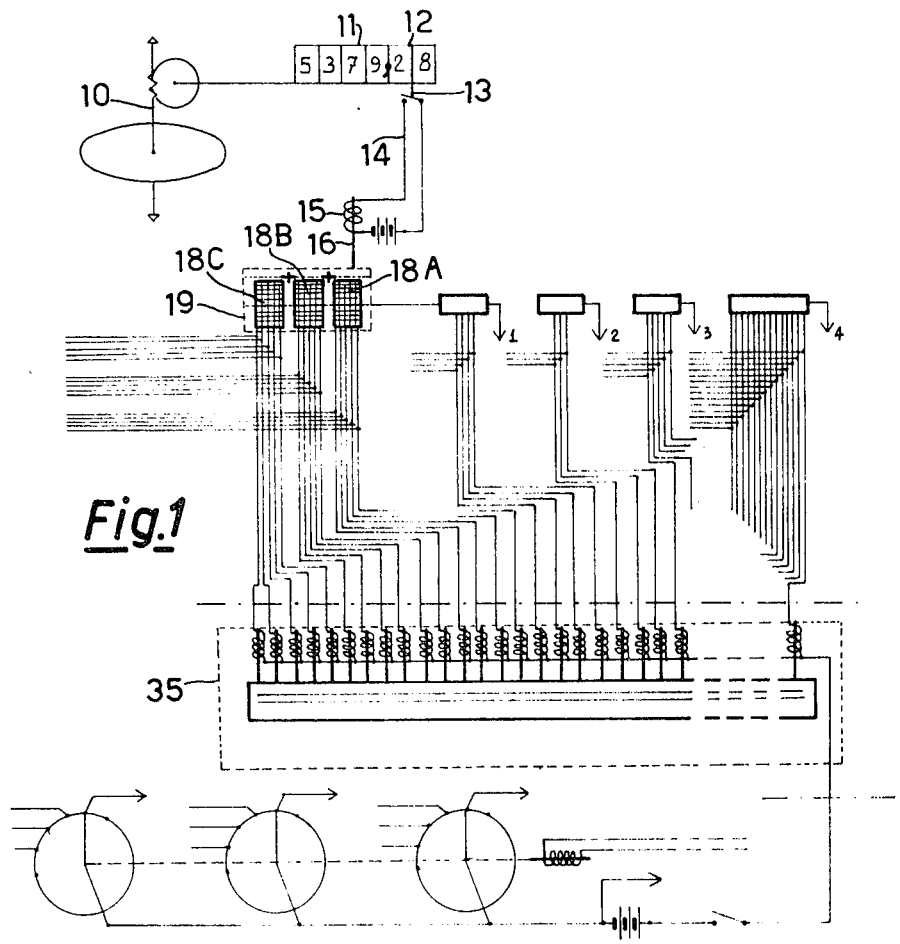
FIG. 1 is a diagrammatical view of an electromechanical assembly according to the invention.
Figure 3:
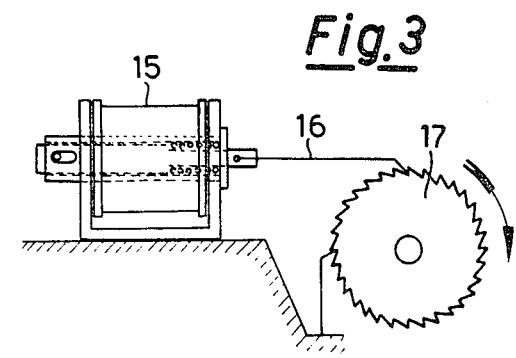
FIG. 3 is a detailed view of the mechanism intended to receive the pulses and convert them into corresponding mechanical movements of the totaling device.

Having now reference to the FIGS. from 1 to 5, a meter 10, of conventional type and which thus need not be described in more detail, is provided, and is fitted with the usual summation device 11 in decimal code. A preselected roller 12, for example, the one which relates to the tenths of a unit, is connected to an electric contact 13 which closes at every revolution, thus generating a pulse. This pulse, through the lead 14, is transferred to a relay 15 which has an actuating rod 16. The rod acts on a toothed wheel 17 integrally connected to the first member of roller 18A of the pulse summing device 19. In the example shown, the pulse summing device 19 comprises three rollers, viz 18A, 18B, 18C, and each roller comprises five discs, viz. 20, 21, 22, 23, 24. Since a binary code has been adopted in the selected example, the discs will have a number of projections or teeth which correspond to orderly decreasing powers of the number two, and, more exactly, for the cam (or rotating disc) 20, the number of teeth is 16, i.e., $2^4$, for the cam 21 is 8, i.e., $2^3$, for the cam 22 is 4, i.e., $2^2$, for the cam 23 is 2, i.e., $2^1$, and, finally, for the cam 24 there is 1 tooth, that is $2^0$.

To each cam an electric contact is associated, which is respectively connoted by 20A 21A, 22A, 23A and 24A. The detection of the positional code of the roller 18A is based on the YES-NO principle, which is characteristic for the binary system, that is to say, either switching ON or switching OFF of the corresponding electric contacts.

In the embodiment illustrated herein, the roller 18A is capable of summing from 0 to 31 unitary forward steps of the meter 11, the rollers 18A and 18B, when paired, can add from 0 to 1023, and the rollers 18A, 18B, when paired, can add from 0 to 1023, and the rollers 18A, 18B, and 18C ganged together can add from 0 to 32,767.

Figure 4:
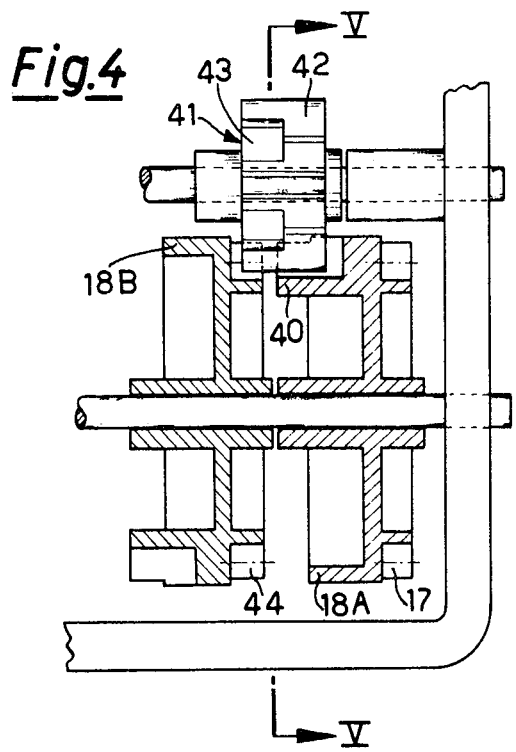
FIG. 4 is a detailed view of the system for actuating two rotary members of the same assembly.
Figure 5:
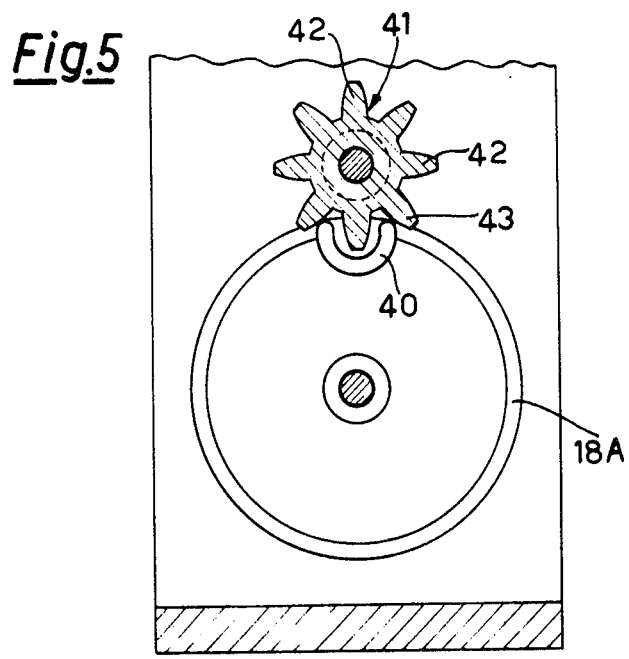
FIG. 5 is another view of the connection of FIG. 4.

At every revolution of the roller 12, the toothed wheel 17, having 32 teeth, will step forward, under the thrust of the rod 16, through 1/32th of a revolution, and all the cams from 20A to 24A inclusive will rotate in unison. When the total of the unitary forward steps has attained 31, all the contacts from A to 24A have been closed and, as shown in FIGS. 4 and 5, the next roller 18B is clutched, in that the double protrusion 40 carried by the roller 18A causes the double-toothed planet gear 41 to be rotated through an angle which is equal to the angle encompassed between two consecutive teeth 42, whereas the teeth of the other crenellation 43 originates a rotation, through two teeth, of the wheel 44: the latter is integral with the roller 18B, so that the rotation is through 1/32 of a revolution. This planet-gear escapement mechanism is conventional and is applied to the usual decimal meters, but to give rise to forward steps of 1/10th of a revolution at a time.

Obviously, after 1031 unitary forward steps of the meter 11, the third roller 18C of the pulse-summing device 19 will be geared on.

The second roller 18B comprises five cams, 25, 26, 27 28 and 29, respectively, whereas the third roller, 18C, comprises the cams 30, 31, 32, 33 and 34. The contacts which correspond to these cams are 25B, 26B 27B 29B, 30C, 31C, 32C 33C and 34C.

The above listed contacts are then connected to terminals which are housed in a specially provided box, not shown in the drawings.

A sensing device is inserted in the box and is connected to a card-punching unit which is generally indicated at 35.

The sensing device, in a manner which is widely known in the telecommunications technique, senses all the terminals and, according to whether the corresponding contact is open or closed, the card or strip is either punched, or not, in the corresponding position.

In addition to the terminals which correspond to the pulse-summing device 19, the box will contain the terminals of other fixed contacts: the latter will also be properly coded in binary so as to recognize the meter or, better to speak, the particular kind of supply to which each card is related.

Figure 6:
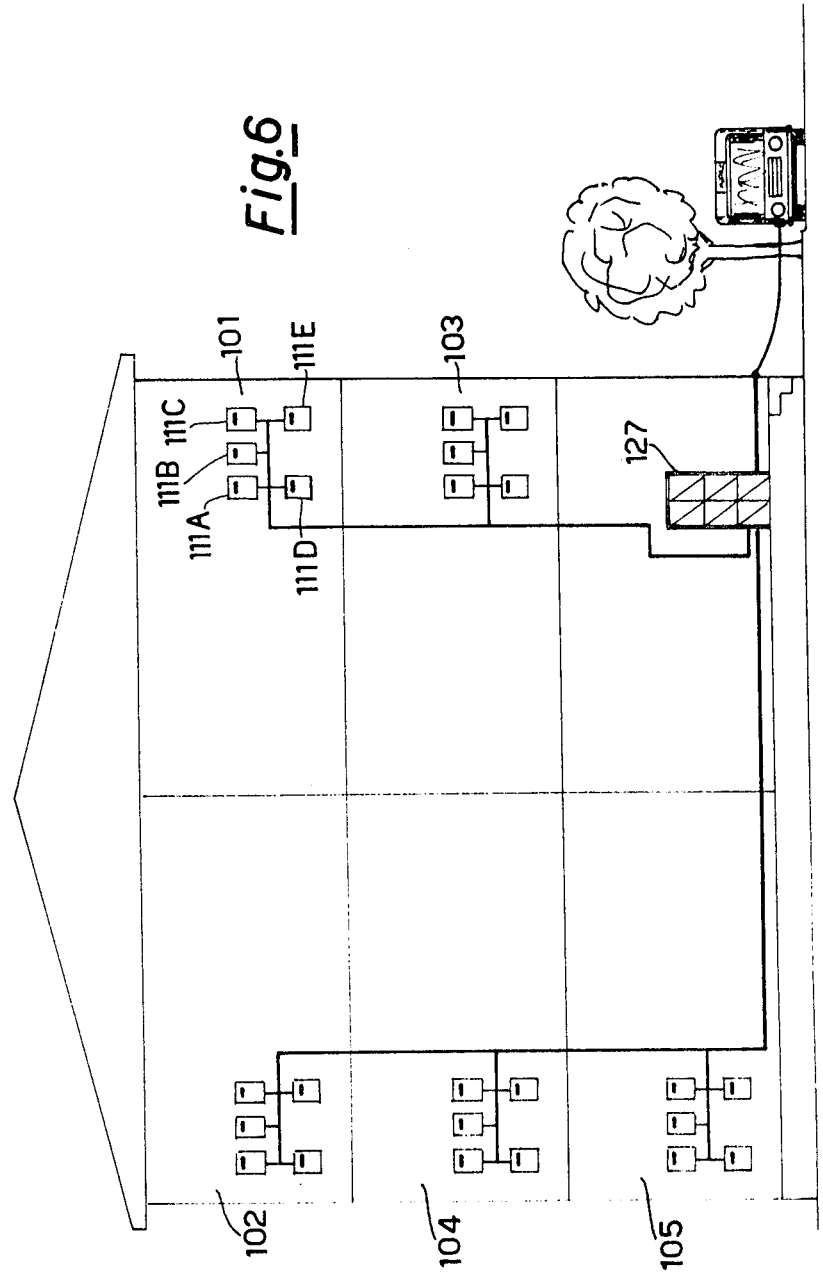
FIG. 6 is a diagrammatical view of a possible grouping of electromechanical assemblies according to the present invention and of their connections to the consumer's meters as well as to a movable card-punching unit.
Figure 7:
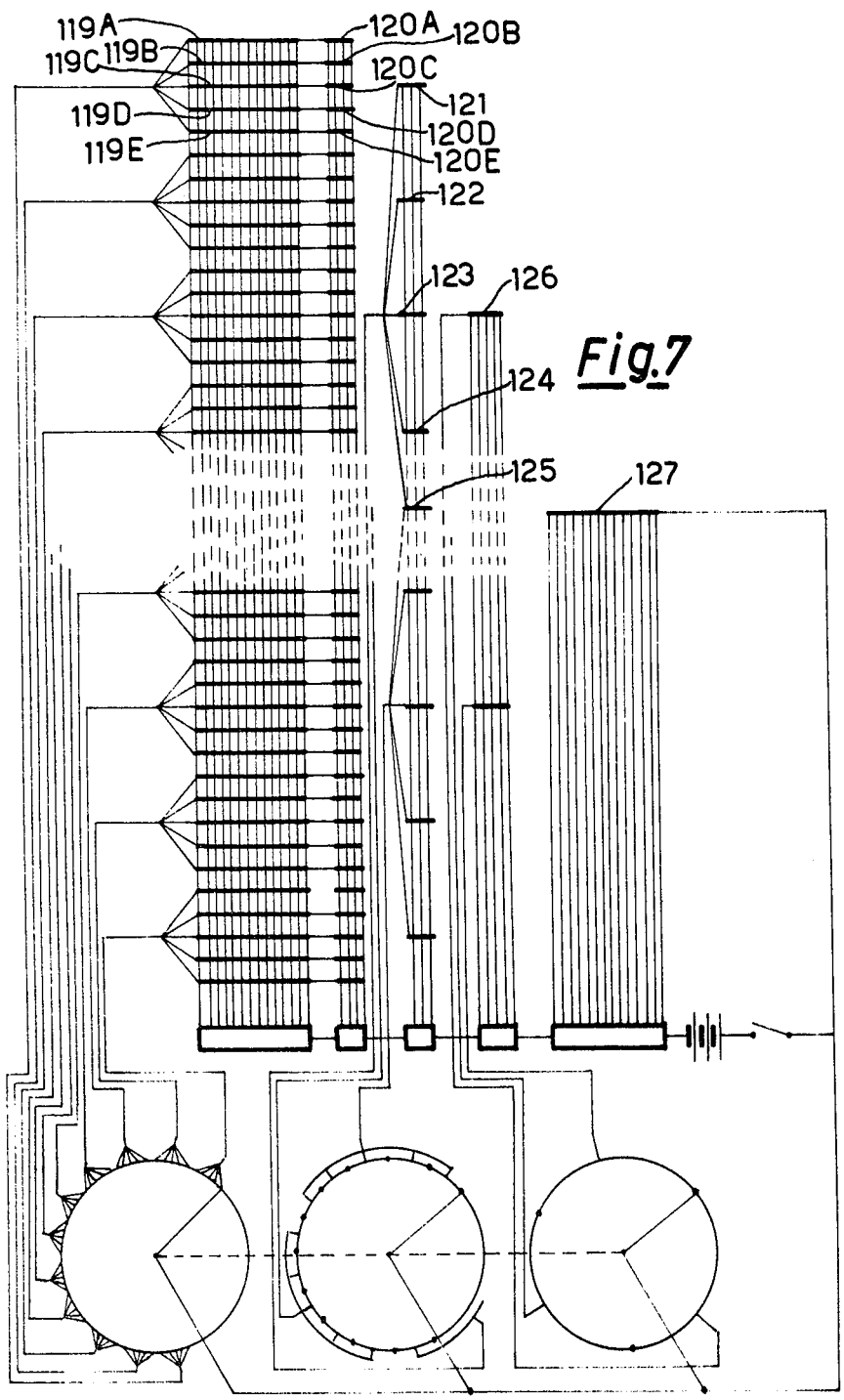
FIG. 7 is a block diagram of the grouping.

Having now reference to FIGS. 6 and 7, an embodiment of the inventive assembly is shown as applied to a distribution system which comprises several different kinds of supply.

As can be seen, each consumer, 101, 102, 103, 104, 105 has five kinds of supply, which correspond to five meters, 11A, 111B, 111C, 111D, 111E. to each meter a pulse-summing device, 119A, 119B, 119C, 119D, 119E is coupled. To each pulse-summing device is coupled, in turn, a supply register 120A, 120B, 120C, 120D, 120E.

In addition, for each consumer, a consumer's supply register is provided, which will be different for the five consumers 101, 102, 103, 104, 105 and is generally indicated by the numerals 121, 122, 123, 124, 125.

Thus, a first grouping of five consumers into a basic unit 126 is catered for.

More basic units make up a central switch board 127, and also the latter has its own code.

It is thus apparent that the box mentioned above will contain, in addition to the terminals coming from pulse-summing devices also those relating to the fixed encoding of the supply code, consumer's code, basic unit code and central switchboard code, respectively: these data will be correspondingly recorded in the form of card punching.

It is obvious, and lies within the purview of an ordinary technician that the sensing member in the box should carry out the sensing of the terminals in attunement with the punching of the sequentially fed cards.

By way of example and with reference to FIG. 7, the punching unit will have:

15 positions operated by the pulse-summing device,
four positions operated by kind of supply code,
three position operated by the consumer's code,
five positions actuated by the basic unit code,
fourteen positions operated by the central switchboard code
that which makes up a total of 41 positions.

By so doing, it is possible, for example, to utilize the conventional ledger cards and attendant punching unit.

By way of example, a calculation is reported of the capacity of the system according to the example described and numerically illustrated above, which exploits the maximum capacity which can be obtained.

| | |
|---|---|
| Switchboards which can be installed with a 14-position code | 16, 383 |
| Units for each switchborad, with a 5-position code | 31 |
| Consumers per units, with a 3-position code | 7 |
| Meters per consumer, with a 4-position code | 15 |
| Tital number of readable meters | 53,326,665 |

Since the ledger card can be punched on 80 positions the 39 positions which are left permit considerably to widen the limits of the data which can be entered on an individual card, the distribution of the 80 positions being possibly made according to the principles which are deemed more suitable for the particular application envisaged.

It is understood that codes other than the binary code can be chosen according to the individual requirements.

It is also obvious that modifications and changes can be introduced both in the electromechanical assembly the subject of this invention as well as in the combination based thereon: these are numerous and are regarded as being encompassed in the scope of the invention.

What is claimed is:

1. An electromechanical assembly for receiving and summing pulses, particularly for the registration of readings taken from meters, comprising:
   a. means generating said pulses;
   b. means for converting said generated pulses into corresponding mechanical displacements;
   c. means for summing the number of said pulses, actuated by said pulse generating means; including
      1. a plurality of continuously rotatable first members connected by linkage means, wherein the movement of said first members is dependent upon the number of received pulses,
      2. wherein each of said first members includes a plurality of second members integrally connected one to another,
      3. each of said second members comprises a plurality of further means for indicating a given position according to a positional code, the number of said further means being increased from one first member to another according to a geometric series whose ratio is an integer;
   d. and means for detecting said positional code, including means actuated by said further means for translating said positional code into a corresponding numerical code, and means for recording said numerical code on a recording medium.

2. An electromechanical assembly according to claim 1, wherein each of said second members comprises a stepwise continuously rotatable cam disk.

3. An electromechanical assembly for receiving and summing pulses, more particularly for the recording of readings taken from meters, comprising:
   a. means for summing said readings comprising
      1. a plurality of continuously rotatable members connected to each other by linkage means such that the combination of the displacement of said plurality of members corresponds, in terms of a positional code, with the number of received pulses;
      2. wherein each of said plurality of members includes a plurality of component parts integrally connected to each other,
      3. each of said plurality of component parts has a plurality of positional indicators, the number of consecutive component parts of a member being increased according to a geometric series whose ratio is an integer;
   b. means, controlled by said meter through pulses emitted therefrom, for imparting corresponding displacements to a first of said members, the remaining members being controlled by the preceding member to effect an elementary movement at each complete sequence of significant positions taken by said preceding member;
   c. signal generating means, actuated by the position-identifying members carried by the component parts of said members for generating electrical signals representing said positional code;
   d. and means for transferring said readings onto a recording medium, comprising: means operatively connected to said signal generating means for converting said positional code into a corresponding numerical code, and means for recording said corresponding numerical code on recording medium.

4. An electromechanical assembly for receiving and summing pulses, more particularly for the recording of readings taken from meters, comprising:
   a. means for summing said readings, including a plurality of continuously rotatable members each having a plurality of cams integrally rotatable with each other and carrying along their peripheral surfaces a plurality of projections which is sequentially increased according to a geometric series whose ratio is an integer;
   b. means driven by pulses emitted from a meter to cause a first of said members to be advanced in a stepwise manner, the other members being driven to rotate one step for every revolution of the preceding member;
   c. a plurality of signalling means actuated by position-identifying members carried by the component parts which make up said members;
   d. and means for transferring said readings onto recording media comprising a plurality of members driven by a control pulse produced by said signalling means.

5. An electromechanical assembly for receiving and summing pulses, particularly for the registration of meter reading comprising: pulse-generating means; means converting pulses derived from said pulse-generating means into corresponding mechanical displacements; pulse-summing means operatively connected with said converting means, including a plurality of operatively connected continuously rotatable members, said members containing means indicating, in a positional code, an angular displacement of said members, said indicating means increasing in number from one member to the next succeeding member according to a geometrical series whose ratio is an integer; means operatively connected with said indicating means for detecting said positional code, including means for translating said positional code into a corresponding numerical code on a recording medium.

6. An electromechanical assembly according to claim 5, wherein said members are integrally rotatable with each other, said indicating means comprises projections carried on the surfaces of said members, and said detecting means comprises switch means activated by said projections; and further comprising a meter, said pulse generating means being operatively connected with said meter to generate a pulse for each predetermined increment of movement of said meter; and wherein said converting means include means advancing a first of said members in a stepwise manner upon generation of each said pulse and means thereafter advancing each succeeding member in a stepwise manner upon each revolution of a preceding member.

* * * * *